United States Patent
Chou

(10) Patent No.: US 8,634,150 B2
(45) Date of Patent: Jan. 21, 2014

(54) VOICE COIL MOTOR

(75) Inventor: Tai-Hsu Chou, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/587,954

(22) Filed: Aug. 17, 2012

(65) Prior Publication Data

US 2013/0279031 A1    Oct. 24, 2013

(51) Int. Cl.
*G02B 7/02* (2006.01)
*G02B 7/08* (2006.01)
*G02B 7/04* (2006.01)

(52) U.S. Cl.
CPC .. *G02B 7/08* (2013.01); *G02B 7/04* (2013.01); *G02B 7/023* (2013.01)
USPC ............................ 359/824; 359/822; 359/823

(58) Field of Classification Search
USPC ................................................ 359/822–824
See application file for complete search history.

(56) References Cited

U.S. PATENT DOCUMENTS

| | | | |
|---|---|---|---|
| 7,519,284 B2 * | 4/2009 | Chang | 396/89 |
| 2009/0290233 A1 * | 11/2009 | Chou | 359/696 |
| 2011/0058267 A1 * | 3/2011 | Wang | 359/822 |

* cited by examiner

*Primary Examiner* — Zachary Wilkes
*Assistant Examiner* — Daniele Manikeu
(74) *Attorney, Agent, or Firm* — Altis Law Group, Inc.

(57) ABSTRACT

A voice coil motor includes a stationary magnetic field generator with a receiving space, a moveable magnetic field generator received in the receiving space, a lens module, a base, and a lower elastic plate. The moveable magnetic field generator includes a lens retainer. The lens retainer defines a circular hole with internal threads. The lens module forms external threads threadedly engaging with the internal threads. An adhesive is coated between the external and internal threads. The stationary magnetic field generator is supported on the base. The base defines an opening in its center. The lower elastic plate is sandwiched between the base and the stationary magnetic field generator and defines a light passing hole. The lower elastic plate includes an elastic portion surrounding the light passing hole. A cross-sectional area of the elastic portion is less than a cross-sectional area of the opening.

12 Claims, 6 Drawing Sheets

VOICE COIL MOTOR

BACKGROUND

1. Technical Field

The present disclosure relates to a voice coil motor.

2. Description of Related Art

Voice coil motors (VCMs) are widely used as lens actuators in camera modules. VCMs include a stationary magnetic field generator, a moveable magnetic field generator, two elastic plates positioned on two opposite sides of the moveable magnetic field generator, a case, and a base. The case and the base cooperatively form a housing for receiving all the stationary magnetic field generator, the moveable magnetic field generator, and the two elastic plates. The moveable magnetic field generator is moveably received in the stationary magnetic field generator.

In assembly of a VCM, a lens barrel is screwed to the moveable magnetic field generator, and an adhesive is coating in a space between the lens barrel and the moveable magnetic field generator. However, the adhesive may flow along an external sidewall of the lens barrel until coating between the elastic plate and the base. Thereby, the elastic plate is firmly positioned on the base through the spilled adhesive. This decreases a reliability of the VCM.

Therefore, it is desirable to provide a voice coil motor which can overcome the above-mentioned limitations.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Figure 1:
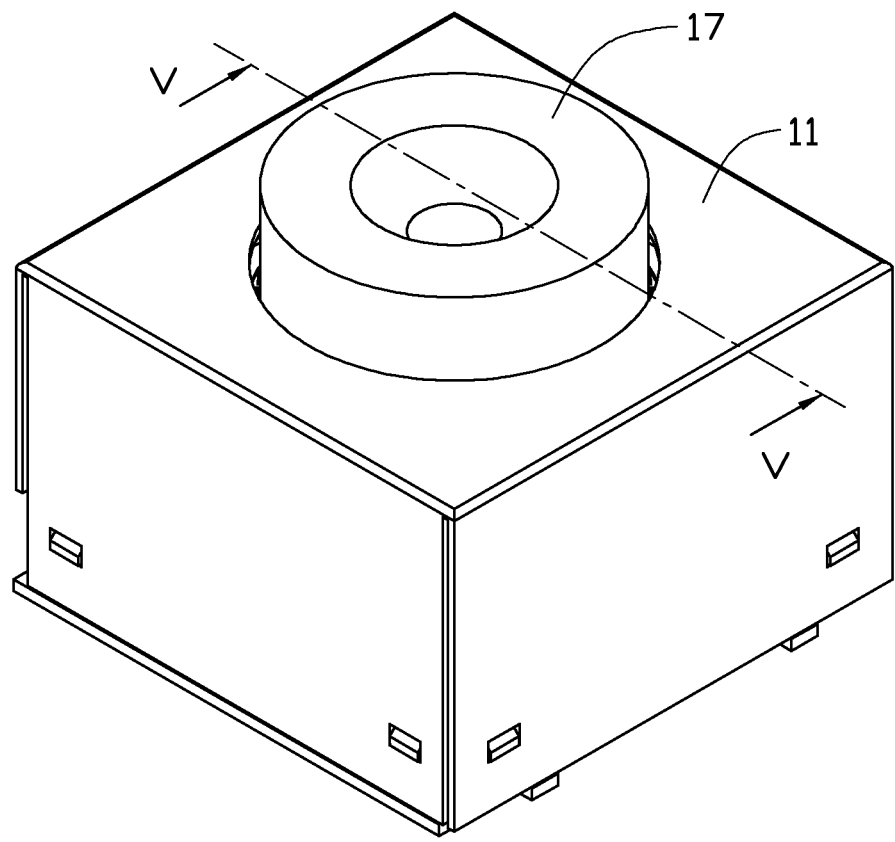
FIG. 1 is an assembled, isometric view of a voice coil motor, according to an exemplary embodiment.
Figure 2:
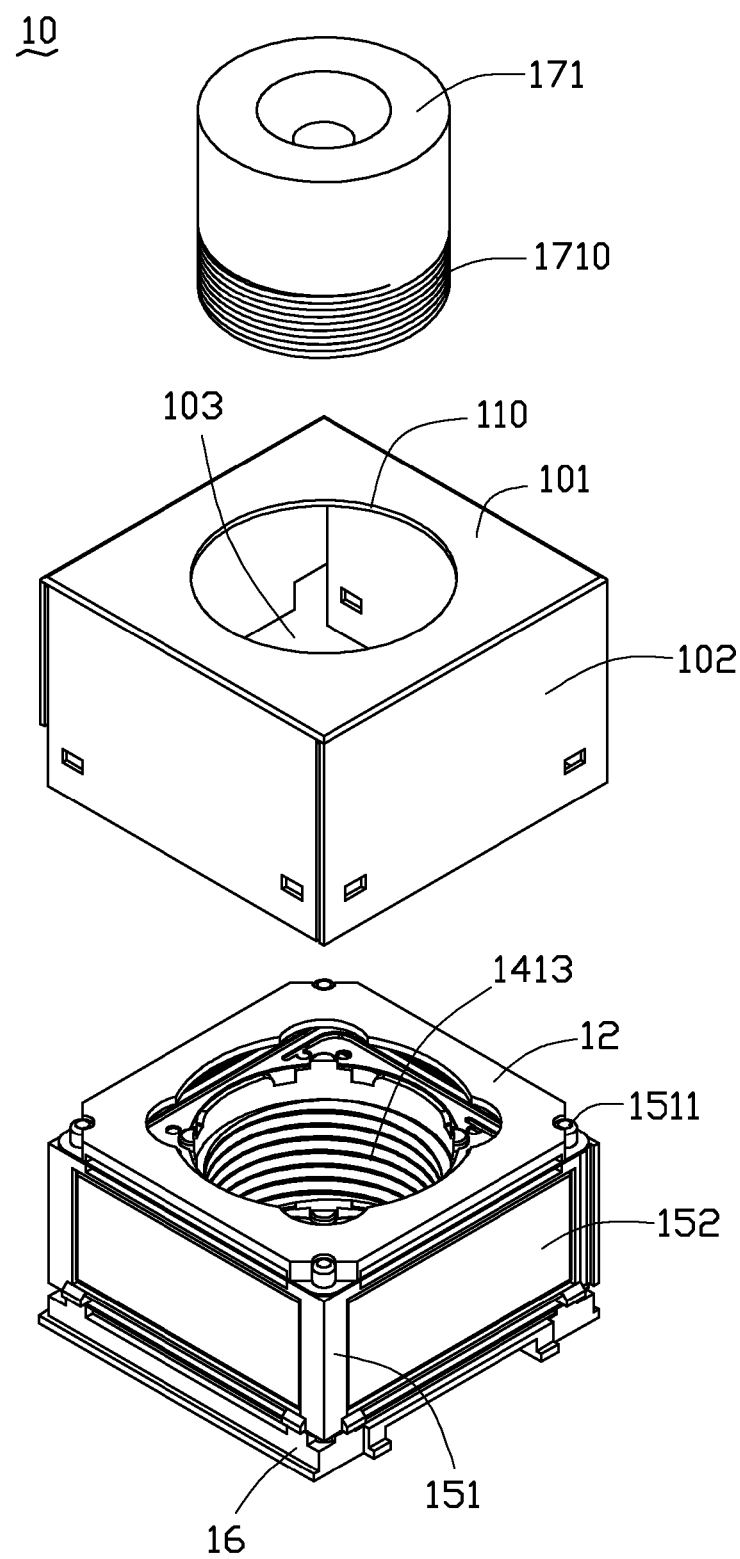
FIG. 2 is an exploded, isometric view of the voice coil motor of FIG. 1.
Figure 3:
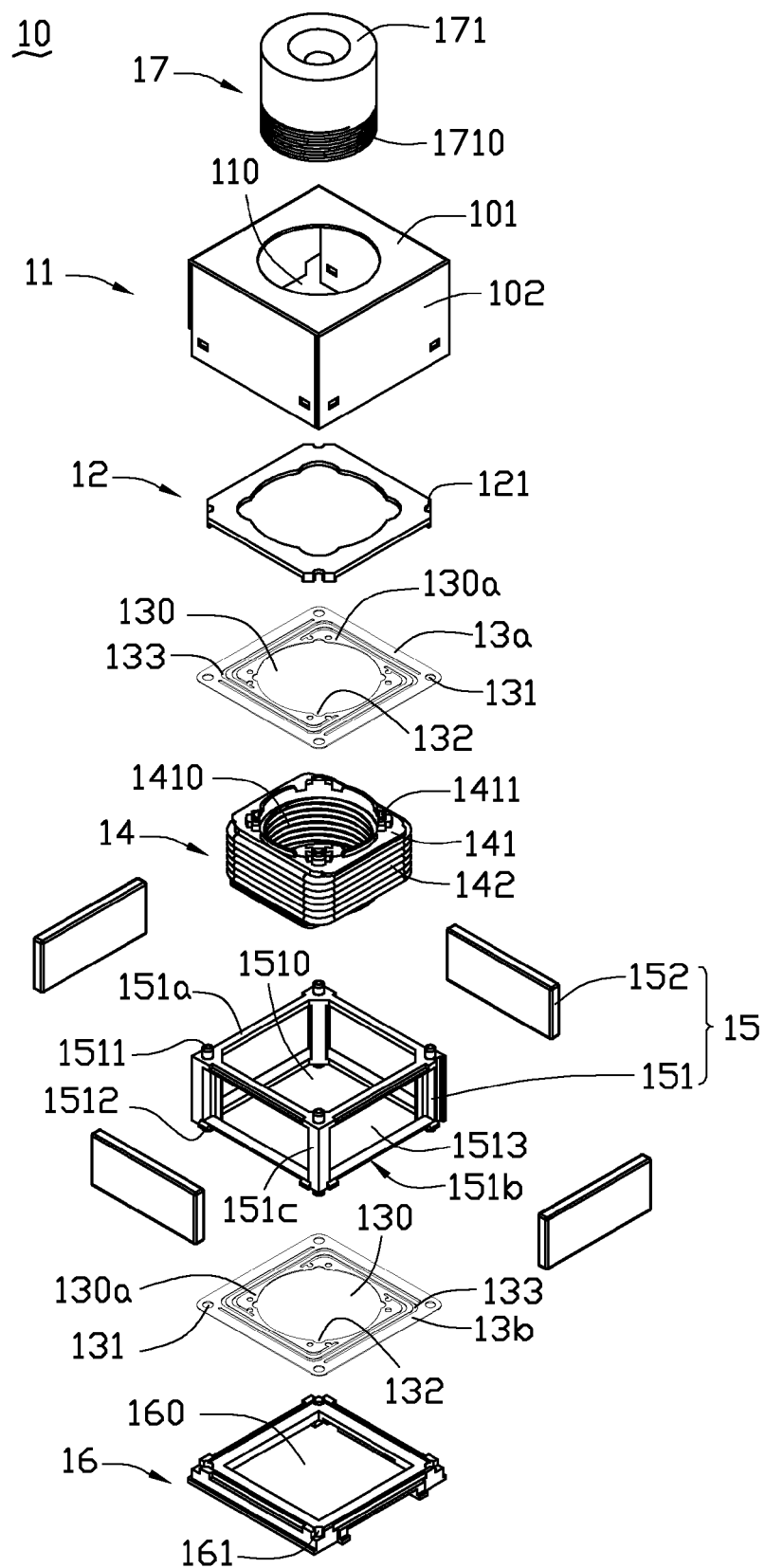
FIG. 3 is an exploded, isometric view of the voice coil motor of FIG. 2, which includes a moveable magnetic field generator.

FIGS. 1-3, illustrate a voice coil motor (VCM) 10, according to an exemplary embodiment. The VCM 10 includes a shell 11, a frame 12, an upper elastic plate 13a, a lower elastic plate 13b, a moveable magnetic field generator 14, a stationary magnetic field generator 15, a base 16, and a lens module 17.

The shell 11 is made of electrically conductive materials, such as a conductive alloy, a conductive polymer, or conductive glass, which provides electro EMI shielding for the VCM 10. In this embodiment, the shell 11 is made of ferronickel alloy. The shell 11 includes a top plate 101 and four side plates 102. In the embodiment, the top plate 101 is substantially square. The four side plates 102 perpendicularly extend downwards from the periphery of the top plate 101, respectively. The top plate 101 and the four side plates 102 cooperatively form a receiving room 103 for receiving the frame 12, the upper elastic plate 13a, the lower elastic plate 13b, the moveable magnetic field generator 14, the stationary magnetic field generator 15, and the base 16. The shell 11 defines a through hole 110 generally at the center of the top plate 101.

The frame 12 is substantially square, corresponding to the top plate 101 in shape. The frame 12 is made of plastic and defines four upper alignment holes 121. Each of the upper alignment holes 121 is generally defined at a corner of the frame 12 and passes through the frame 12.

The upper elastic plate 13a is stamped from a metal plate, which has a shape of substantially a rectangular frame. The upper elastic plate 13a defines a first light passing hole 130 substantially at the center of the upper elastic plate 13a, and four first alignment holes 131 generally at four corners of the upper elastic plate 13a. The upper elastic plate 13a includes a first elastic portion 130a around the first light passing hole 130. The first elastic portion 130a is substantially rectangular. The first elastic portion 130a defines a number of slots 133 around the light passing hole 130, thereby enabling the upper elastic plate 13a to have elasticity. The elastic portion 130a defines four first guiding holes 132.

The structure of the lower elastic plate 13b is similar to the structure of the upper elastic plate 13a.

Figure 4:
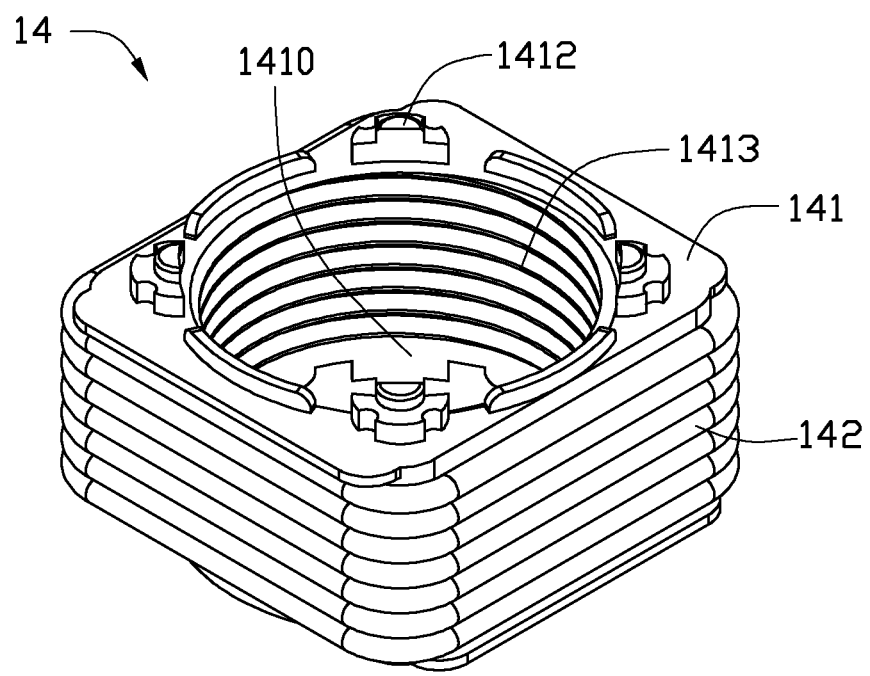
FIG. 4 is a schematic, isometric view of the moveable magnetic field generator in FIG. 3, but viewed from another angle.
Figure 5:
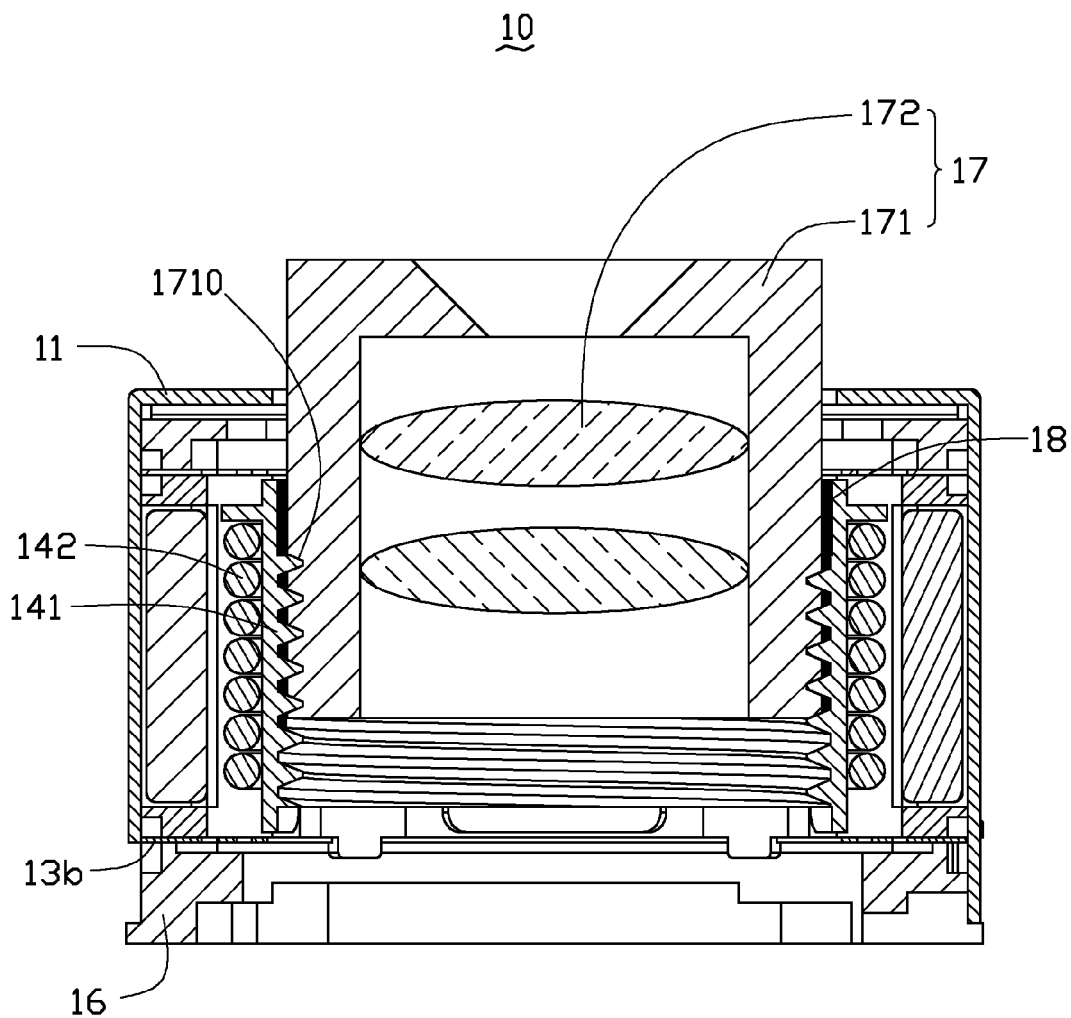
FIG. 5 is a cross-sectional view taken along line V-V of FIG. 1.
Figure 6:
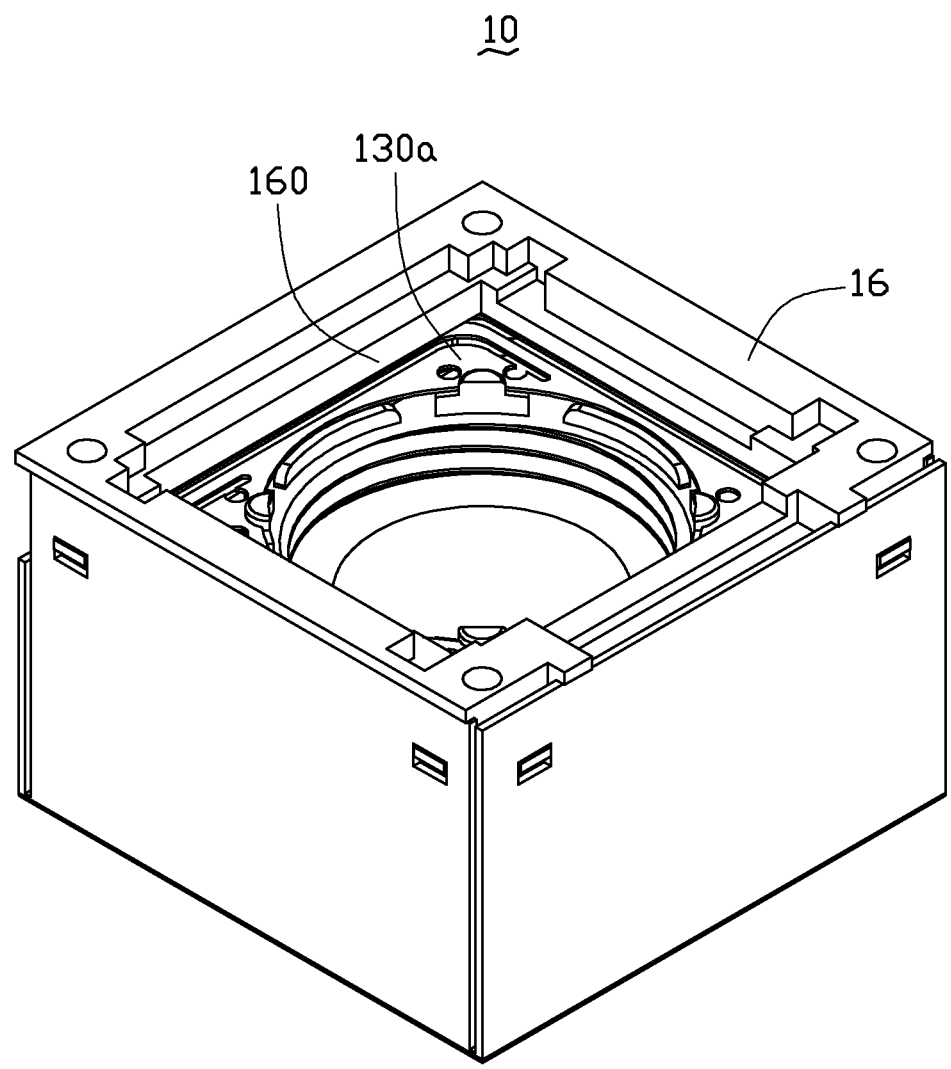
FIG. 6 is a schematic, isometric view of the voice coil motor in FIG. 1, but viewed from another angle.

The movable magnetic field generator 14 includes a lens retainer 141 and coils 142 wrapped around the lens retainer 141. The lens retainer 141 defines a circular hole 1410 passing through two end surfaces for receiving the lens module 17. The lens retainer 141 has internal threads 1413 formed on an internal wall of the circular hole 1410. A top end of the lens retainer 141 extends four first positioning posts 1411. The four first positioning posts 1411 perpendicularly extend upwards from the top end of the lens retainer 141 and are parallel to the central axis of the lens retainer 141. Each of the four first positioning posts 1411 is configured to engage with a respective one of the first guiding holes 132 of the upper elastic plate 13a. A bottom end of the lens retainer 141 extends four second positioning posts 1412 (as shown in FIG. 4). The four second positioning posts 1412 perpendicularly extend downwards from the bottom end of the lens retainer 141 and are parallel to the central axis of the lens retainer 141. Each of the four second positioning posts 1411 is configured to engage with a respective one of the first guiding holes 132 of the lower elastic plate 13b.

The stationary magnetic field generator 15 includes a supporting frame 151 and four permanent magnetic elements 152 mounted in the supporting frame 151.

The supporting frame 151 is positioned between the upper elastic plate 13a and the lower elastic plate 13b. The supporting frame 151 is substantially a cuboid frame and defines a receiving space 1510. The receiving space 1510 is configured for receiving the moveable magnetic field generator 14.

The supporting frame 151 further includes four upper alignment poles 1511 extending upward from four corners of a top surface 151a of the supporting frame 151, and four lower alignment poles 1512 respectively extending downwards from four corners of a bottom surface 151b of the supporting frame 151. Each of the upper alignment poles 1511 spatially corresponds to a respective one of the upper alignment holes 121 of the frame 12 and a respective one of the first alignment holes 131 of the upper elastic plate 13a. Four sidewalls 151c perpendicularly connect between the top surface 151a and the bottom surfaces 151b. Each of the upper alignment poles 1511 passes through a respective one of the first alignment holes 131 of the upper elastic plate 13a, and engages with a respective one of the upper alignment holes 121 of the frame 12. As such, the upper elastic plate 13a is sandwiched between the frame 12 and the supporting frame 151.

The supporting frame 151 also defines four accommodating holes 1513. Each accommodating hole 1513 is defined through a corresponding sidewall 151c of the supporting frame 151 and in communication with the receiving space 1510. The four permanent magnetic elements 152 are correspondingly received in the accommodating holes 1513, thereby mounting to the peripheral sides of the supporting frame 151 serving as sidewalls of the stationary magnetic field generator 15.

The base 16 is made of plastic or resin and substantially cuboid. Each corner of four corners of the base 16 defines a locating hole 161. The base 16 defines an opening 160 in the center of the base 16. Each of the lower alignment poles 1512 passes through a respective one of the first alignment holes 131 of the bottom elastic plate 13b and engages with a respective one of the locating holes 161. As such, the lower elastic plate 13b is sandwiched between the supporting frame 151 and the base 16. In the embodiment, a cross-sectional area of the elastic portion 130a perpendicular to an optical axial direction of the VCM 10 is less than a cross-sectional area of the opening 160 of the base 16 perpendicular to the optical axial direction of the VCM 10.

The lens module 17 includes a lens barrel 171 and a number of lens 172 received in the lens barrel 171. The lens module 17 has external threads 1710 formed on an external wall of the lens barrel 171 for being threadedly engaged with the internal threads 1413 of the moveable magnetic field generator 14, thereby the lens barrel 171 is received in and is engaged with the moveable magnetic field generator 14. The internal diameter of the lens barrel 171 is smaller than or equal to that of the diameter of the first through hole 110 of the shell 11. A adhesive 18 is coated between the external threads 1710 of the lens module 17 and the internal threads 1413 of the moveable magnetic field generator 14, as such, some particles produced by the internal threads 1413 and external threads 1710, because friction between internal threads 1413 and external threads 1710, will be adsorbed by the adhesive 18.

Referring to FIGS. 2, 4, 5, and 6, in assembling, the lower elastic plate 13b is mounted on the base 16 with each of the locating holes 161 aligning with a respective one of the first alignment holes 131 of the lower elastic plate 13b. The moveable magnetic field generator 14 is seated on the lower elastic plate 13b with each of the four second positioning posts 1412 engaging with a respective one of the first guiding holes 132 of the lower elastic plate 13b. Each of the magnets 152 is received in a respective one of the accommodating holes 1513. The stationary magnetic field generator 15 is seated on the lower elastic plate 13b with the bottom surface 15b being attached on the lower elastic plate 13b. Each of the four lower alignment poles 1512 is received in a respective one of the first alignment holes 131 of the lower elastic plate 13b and a respective one of the locating holes 161. As such, the moveable magnetic field generator 14 is received in the receiving space 1510 of the supporting frame 151.

Then, the upper elastic plate 13a is mounted on the top surface 151a of the supporting frame 151, with each of the first alignment holes 131 of the upper elastic plate 13a being engaged with a respective one of the upper alignment poles 1511 of the supporting frame 151, and each of the four first positioning posts 1411 of the lens retainer 141 being engaged with a respective one of the first guiding holes 132 of the upper elastic plate 13a.

The frame 12 is adhered to the upper elastic plate 13a with each of the upper alignment holes 121 being aligned with a respective one of the first alignment holes 131 of the upper elastic plate 13a. Each of the upper alignment poles 1511 is received in a respective one of the upper alignment holes 121. The frame 12, the upper elastic plate 13a, the lower elastic plate 13b, the moveable magnetic field generator 14, the stationary magnetic field generator 15, and the base 16 are accommodated in the shell 11. The frame 12 is attached and is adhered to the top plate 101. The lens module 17 is partly received in the through hole 110 of the shell 11, with the external threads 1710 being threadedly engaged with the internal threads 1413 of the moveable magnetic field generator 14. An optical axis of the lens module 17 coincides with a central axis of the lens retainer 141. The adhesive 18 is coated between the external threads 1710 and internal threads 1413. As such, assembly of the VCM 10 is completed. In the embodiment, because the cross-sectional area of the elastic portion 130a perpendicular to the optical axial direction of the VCM 10 is less than the cross-sectional area of the opening 160 of the base 16 perpendicular to the optical axial direction of the VCM 10, this prevent the adhesive 18 from being coated between the lower elastic plate 13b and the base 16. Therefore, this increases the reliability of the VCM 10.

In alternative embodiments, the frame 12 can be omitted to reduce the cost of the VCM 10.

In use, when applying current to the coils 142, magnetic driving forces between the magnets 152 and the coils 142 are generated, therefore the lens module 17 can be held in the movable magnetic field generator 14 and driven to move along with the movable magnetic field generator 14 for focusing.

It will be understood that the above particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A voice coil motor comprising:
   a stationary magnetic field generator defining a receiving space;
   a moveable magnetic field generator received in the receiving space and comprising a lens retainer and coils wrapping around the lens retainer, the lens retainer defining a circular hole, the lens retainer having internal threads formed on an internal wall of the circular hole;
   a lens module partially received in the circular hole and forming external threads threadedly engaging with the internal threads;
   a adhesive coated between the external and internal threads;
   a base, the stationary magnetic field generator supported on the base, the base defining an opening in the center of the base; and
   a lower elastic plate sandwiched between the base and the stationary magnetic field generator, the lower elastic plate defining a light passing hole aligned with the opening of the base, the lower elastic plate comprising an elastic portion surrounding the light passing hole, a cross-sectional area of the elastic portion perpendicular to an optical axial direction of the voice coil motor is less than a cross-sectional area of the opening of the base perpendicular to the optical axial direction of the voice coil motor.

2. The voice coil motor of claim 1, wherein the stationary magnetic field generator comprises a supporting frame and four permanent magnetic elements mounted in the supporting frame, the supporting frame is substantially a cuboid frame, the receiving space is defined in the supporting frame.

3. The voice coil motor of claim 2, wherein the supporting frame comprises a plurality of lower alignment poles respectively extending downward from a bottom surface of the supporting frame, the lower elastic plate defines a plurality of first alignment holes, the base defines a plurality of locating holes, each of the locating holes aligns with a respective one of the first alignment holes, each of the lower alignment poles passes through a respective one of the first alignment holes and engages with a respective one of the locating holes.

4. The voice coil motor of claim 2, further comprising an upper elastic plate, wherein the upper elastic plate defines a plurality of first alignment holes, the supporting frame further comprises a plurality upper alignment poles extending upward from a top surface of the supporting frame, each of the upper alignment poles spatially corresponds to a respective one of the first alignment holes, each of the upper alignment poles passes through a respective one of the first alignment holes of the upper elastic plate.

5. The voice coil motor of claim 4, further comprising a frame mounted on the upper elastic plate, wherein the frame defines four upper alignment holes, each upper alignment poles also spatially corresponds to a respective one of the upper alignment holes, each of upper alignment poles passes through a respective one of the first alignment holes of the upper elastic plate and engages with a respective one of the upper alignment holes of the frame.

6. The voice coil motor of claim 5, wherein the frame is made of plastic.

7. The voice coil motor of claim 5, wherein the lens retainer comprises a plurality of first positioning posts extending from its top end, the first positioning posts are parallel to a central axis of the lens retainer, the upper elastic plate comprises an elastic portion defining a plurality of first guiding holes, each of the first positioning posts engages with a respective one of the first guiding holes of the upper elastic plate.

8. The voice coil motor of claim 7, wherein the elastic portion of the lower elastic plate defines a plurality of first guiding holes, the lens retainer comprises a plurality of second positioning posts extending from its bottom end, the second positioning posts are parallel to the central axis of the lens retainer, each of the second positioning posts engages with a respective one of the first guiding holes of the lower elastic plate.

9. The voice coil motor of claim 8, wherein both the elastic portions of the upper and bottom elastic plate defines a plurality of slots.

10. The voice coil motor of claim 8, further comprising a shell, wherein the shell comprises a top plate and four side plates, the four side plates perpendicularly extend downwards from a periphery of the top plate, respectively, the top plate and the four side plates cooperatively form a receiving room, the receiving room receives the frame, the upper elastic plate, the lower elastic plate, the stationary magnetic field generator, the moveable magnetic field generator, and the base.

11. The voice coil motor of claim 10, wherein the shell defines a through hole generally at the center of the top plate.

12. The voice coil motor of claim 10, wherein the shell is made of a conductive alloy, a conductive polymer, or conductive glass.

* * * * *